United States Patent
Aastuen et al.

(10) Patent No.: US 6,525,816 B2
(45) Date of Patent: Feb. 25, 2003

(54) METHOD FOR MEASURING THE ABSOLUTE LIGHT THROUGHPUT OF REFLECTIVE-MODE DISPLAYS IN AN OPTICAL SYSTEM

(75) Inventors: David J. W. Aastuen, Farmington, MN (US); Charles L. Bruzzone, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 217 days.

(21) Appl. No.: 09/750,563

(22) Filed: Dec. 28, 2000

(65) Prior Publication Data

US 2002/0126282 A1 Sep. 12, 2002

(51) Int. Cl.$^7$ .................................................. G01J 4/00
(52) U.S. Cl. ........................ 356/364; 356/368; 356/369
(58) Field of Search ................................ 356/364, 369, 356/365, 366, 367, 368; 353/20; 324/770

(56) References Cited

U.S. PATENT DOCUMENTS 6,071,748 A * 6/2000 Modlin et al. ............ 250/459.1

FOREIGN PATENT DOCUMENTS

EP        0 734 184 A      9/1996

OTHER PUBLICATIONS

Kubota, S., "Reflectance and contrast measurements of reflective liquid crystal displays," *Displays*, 18:79–83, Aug. 1997.
International Search Report, PCT/US01/14332 dated Dec. 6, 2001.

E. H. Stupp, M. S. Brennesholtz, "*Projection Displays*", Wiley–SID Series in Display Technology, 1999, pp. 238–261.

F. E. Doany et al, "*Projection Display Throughput: Efficiency of Optical Transmission and Light–source Collection*", IBM J. Res. Dev., vol. 42, No. 3/4, May/Jul. 1998, pp. 3870–3899.

E. G. Colgan and M. Uda, "*On–chip Metallization Layers for Reflective Light Valves*", IBM J. Res. Dev., vol. 42, No. 3/4 May/Jul. 1998, pp. 339–345.

K. H. Yang and M. Lu, "*Nematic LC Modes and LC Phase Gratings for Reflective Spatial Light Modulators*", IBM J. Res. Dev., vol. 42, No. 3/4, May/Jul. 1998, pp. 401–410.

David Armitage, "*Resolution Issues in Reflective Microdisplays*", SPIE, vol. 3634, 0277–786X/99, Jan. 1999, pp. 10–19.

Matthew Bone et al., "*Novel Optical System Design for Reflective CMOS Technology*", SPIE, vol. 3634, 0277–786X, Jan. 1999, pp. 80–86.

J. H. Morrissy et al., "*Reflective Micordisplays for Projection or Virtual–view Applications*", SID 99 Digest, pp. 808–811.

(List continued on next page.)

*Primary Examiner*—Frank G. Font
*Assistant Examiner*—Roy M. Punnoose
(74) *Attorney, Agent, or Firm*—Nestor F. Ho; Yen Tong Florczak

(57) ABSTRACT

A method for measuring the absolute throughput of a polarization modulating reflective display in an optical system having a folded light path. The steps include measuring a first light intensity, $L_R$, in the folded light path, having a first polarizing beam splitter, and a reflective display. A second intensity, $L_O$, is measured using an unfolded light path where the reflective display is replaced by a second cross-rotated polarizing beam splitter. The absolute throughput is $T_M$ is calculated, where $T_M = L_R/L_O$.

14 Claims, 7 Drawing Sheets

OTHER PUBLICATIONS

Michael D. Wilson, "*Methods for Measuring Performance of LCOS Microdisplays*", (Paper), pp. 1–4.

American National Standards Institute, Inc., "*Data Projection Equipment and Large Screen Data Displays—Test Methods and Performance Characteristics*", ANSI, Aug. 6, 1992, pp. i–iii, 1–18.

Paul A. Boynton et al., "*Meeting the Metrology Needs of the Microdisplay Industry*", National Institute of Standards and Technology, Program, Microdisplay 2000, Conference Aug. 7–9, 2000, pp. (8).

Bart Verweire et al., "*Limitation of Resolution of LCOS–based Projection Displays by Diffraction Effect*", EuroDisplay '99, 1999, pp. 489–492.

Matthias Pfeiffer, "*LC Modes for Reflective Liquid Crystal on Silicon Microdisplays*", Program, Microdisplay 2000, Aug. 7–9, 2000.

Matthias Pfeiffer, "*LC Modes for LCoS Microdisplays*", Information Display 2/01, vol. 17, No. 2, Feb. 2001, pp 20–23.

* cited by examiner

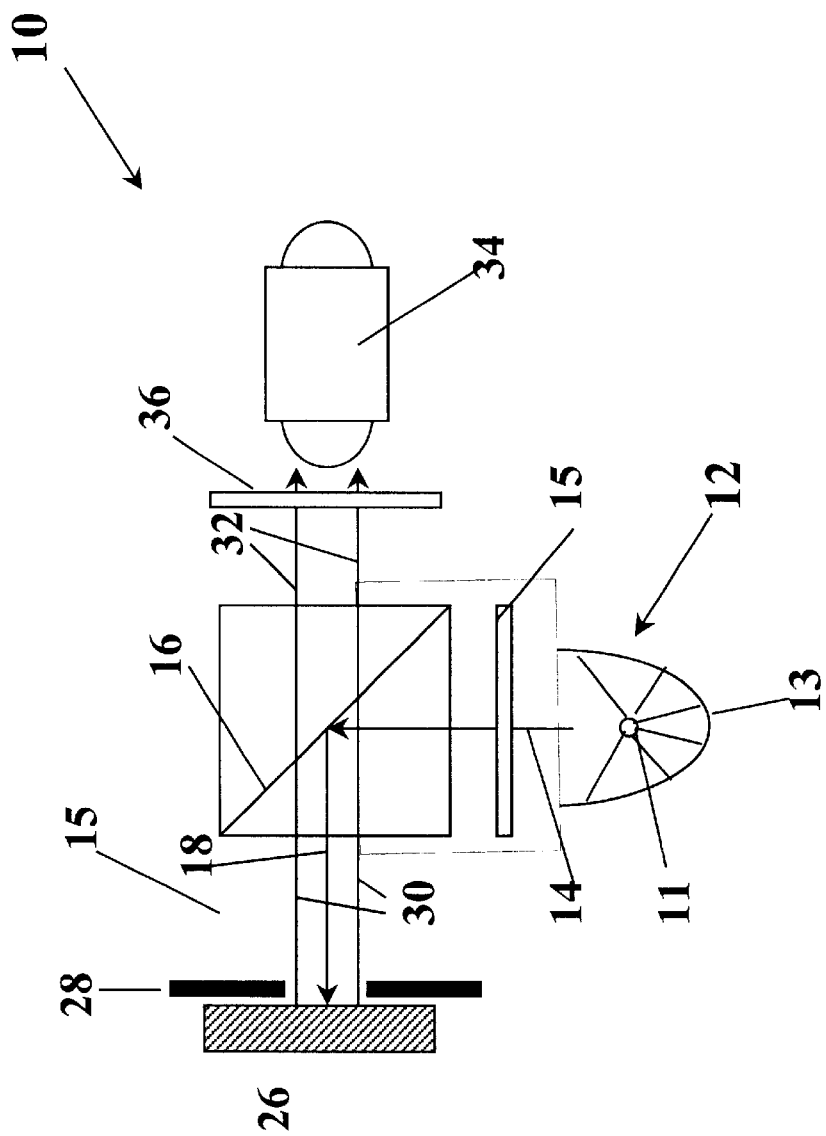

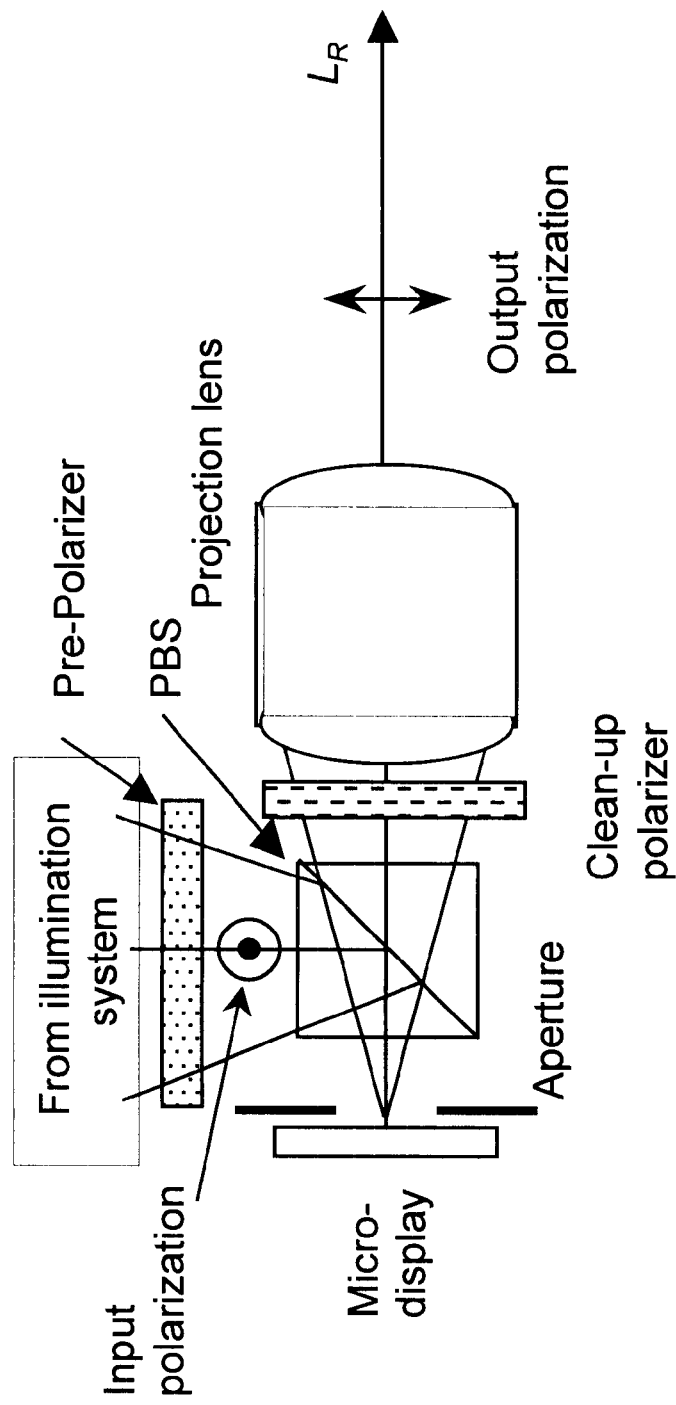

METHOD FOR MEASURING THE ABSOLUTE LIGHT THROUGHPUT OF REFLECTIVE-MODE DISPLAYS IN AN OPTICAL SYSTEM

BACKGROUND OF THE INVENTION

The present invention relates to a novel method for measuring the absolute light throughput of polarization-modulating reflective display systems in a given optical system.

An optical system is defined in the present case as a system that prepares light to achieve a desired optical image. The term optical system is intended to include display systems such as head-mounted displays and electronic projection displays.

Every optical component in an optical system has a light throughput or efficiency. Light throughput of a transmissive optical component is the fractional amount of the incident light that the component transmits, i.e., the percentage of light that is not reflected, absorbed or scattered by the component. The light throughput of a reflective optical component is defined as the fractional amount of the incident light that the component reflects, i.e., the percentage of light that is not transmitted, absorbed or scattered by the component.

Light output is a significant factor in assessing and designing optical display systems, such as electronic projectors. In meetings and presentation, presenters frequently use electronic projectors coupled to personal computers to deliver electronic presentations (e.g., Microsoft Power-Point$^{TM}$ presentations). The light output of the system helps determine the brightness of the projected images, so high light output is desirable. Light output is affected by each component in direct proportion to the throughput of that component.

Optical display systems generally use either transmissive mode or reflective mode displays. In transmissive mode systems the light passes through the display or imager. In reflective mode systems, the display reflects light.

Many companies are concentrating on developing reflective-mode displays seeking lower costs and higher resolutions. Promising new reflective-mode displays include liquid crystal on silicon (LCOS) devices. These devices use polarized incident light and reflect polarization-modulated light.

Designers of reflective-mode displays traditionally use a model or measurement of the light transmitted through each component in the system, assigning a fractional transmission value, and then calculating the product of all these transmission values (see, E. H. Stupp, M. S. Brennesholtz, *Projection Displays*, Wiley-SID Series in Display Technology, 239 ff. (1999), F. E. Doany, R. N. Singh, A. E. Rosenbluth, and G. L.-T. Chiu, "Projection display throughput: Efficiency of optical transmission and light-source collection," *IBM J. Res. Develop., 42, 387–399* (1998), which are hereby included by reference). To date, it has been difficult to establish such fractional transmission levels for liquid crystal on silicon (LCOS) microdisplays, or even to compare throughput specifications of one LCOS device with another. This is due to the difficulties of accurately modeling or measuring throughput for these devices.

Measuring the throughput is difficult due to the reflective nature of the displays. Because they are reflective, the throughput of an LCOS microdisplay is generally measured as compared to a reference, usually a quarter-wave film (QWF) laminated to a mirror. A traditional method for calculating reflective display output in a system first measures the light throughput of the system using a quarter-wave plate and a mirror in place of the reflective display. J.H. Morrissy et al., "Reflective Microdisplays for Projection or Virtual-View Applications", 808, SID 1999 Digest, describes a procedure where the reflectivity of reflective-mode displays is calibrated using an aluminum mirror optically coupled to a broad-band quarter-wave retarder plate, or QWF. In this technique, an imager is first driven to its fully bright state and the resulting light output is measured. Then the imager is replaced with the quarter-wave laminate described above and the output is measured again. The first measurement is divided by the second measurement to provide a throughput value.

While such measurements can yield good comparative results between various LCOS microdisplays, absolute microdisplay throughput depends in this case on knowing the reflectance of the reference mirror and QWF. This is especially difficult when spectral throughput is desired. Problems with this approach include the fact that both the mirror and the QWF introduce unknown inaccuracies into the measurement. Since there are no perfect optical devices, both the mirror and the QWF have their own throughputs, which are ignored in the calculation. There are no standard mirrors or quarter-wave plates used for these measurements, so measurements for the same displays are not uniform. As a result, the tester then is faced with the task of trying to define the optical characteristics of the mirror and quarter wave plate (see, e.g., M. D. Wilson, "Methods of Measuring Performance of LCOS Microdisplays", Microdisplay 2000, Aug. 7–9, 2000).

Furthermore, every display may behave differently in a different system. For example, quarter-wave plates are traditionally only precisely one quarter-wave at one wavelength, so each test has to use at least three different quarter-wave plate/film for red, green, and blue ("RGB", the primary colors used to produce every other color in traditional display systems). Different plates and different RGB tests will yield different results. Even a broadband QWF has different transmission rates for each RGB color. Other factors such as the incidence angle, the temperature, the lamp spectrum, and the input and output#s of the particular optical system also affect the measurements.

The need remains for a method to calculate the absolute throughput of reflective displays in a system in an accurate and repeatable fashion.

SUMMARY OF THE INVENTION

The present invention is directed to a method for measuring the absolute light throughput of a polarization modulating reflective display in an optical system having a folded light path. The method includes the steps of measuring a first light intensity, $L_R$, delivered in the folded light path. The folded light path includes an illumination system producing a light beam, a first polarizing beam splitter, the reflective display, and a projection system. A first polarization component of a light beam prepared by the optical system is folded by a first polarizing beam splitter and a second polarization component of the light beam is transmitted by the first polarizing beam splitter, wherein one of the polarization components is reflected off the reflective display.

A second light intensity, $L_O$, delivered by the optical system in an unfolded light path also is measured. The unfolded light path includes the same components as the folded light path, with the exception that in the unfolded light path, the reflective display has been removed. The unfolded light path has the first polarizing beam splitter and a second cross rotated polarizing beam splitter having equivalent optical performance characteristics. The light beam is transmitted by one of the PBS and reflected by the other.

The absolute throughput, $T_M$, then is calculated, where $TM=L_R/L_O$.

The polarization component reflected off the reflective display may be either the first or the second polarization component. The steps of measuring the first and second light intensities may be accomplished photopically, radiometrically, spectro radiometrically or by other suitable methods.

The illumination system may have variable f/#s, the method further including repeating the steps of measuring the first and the second light intensity for different f/#s of illumination and calculating the absolute throughput for the reflective display for different f/#s of illumination. The projection system also may have variable f/#s, the method further including repeating the steps of measuring the first and the second light intensity for different projection f/#s and calculating the absolute throughput for the reflective display for different projection f/#s.

The illumination system includes a light beam source. The beam of light may include visible light, infrared radiation, ultraviolet photolit patterns, or other types of radiation to be imaged using the reflective display. The light beam source may be a coherent light beam source, a collimated light beam source, or other suitable light sources.

BRIEF DESCRIPTION OF THE DRAWINGS

FIG. 1 is a schematic plan view of an optical display system.

FIG. 2a is test bed with the microdisplay under test in place.

DETAILED DESCRIPTION OF THE INVENTION

Figure 2B:
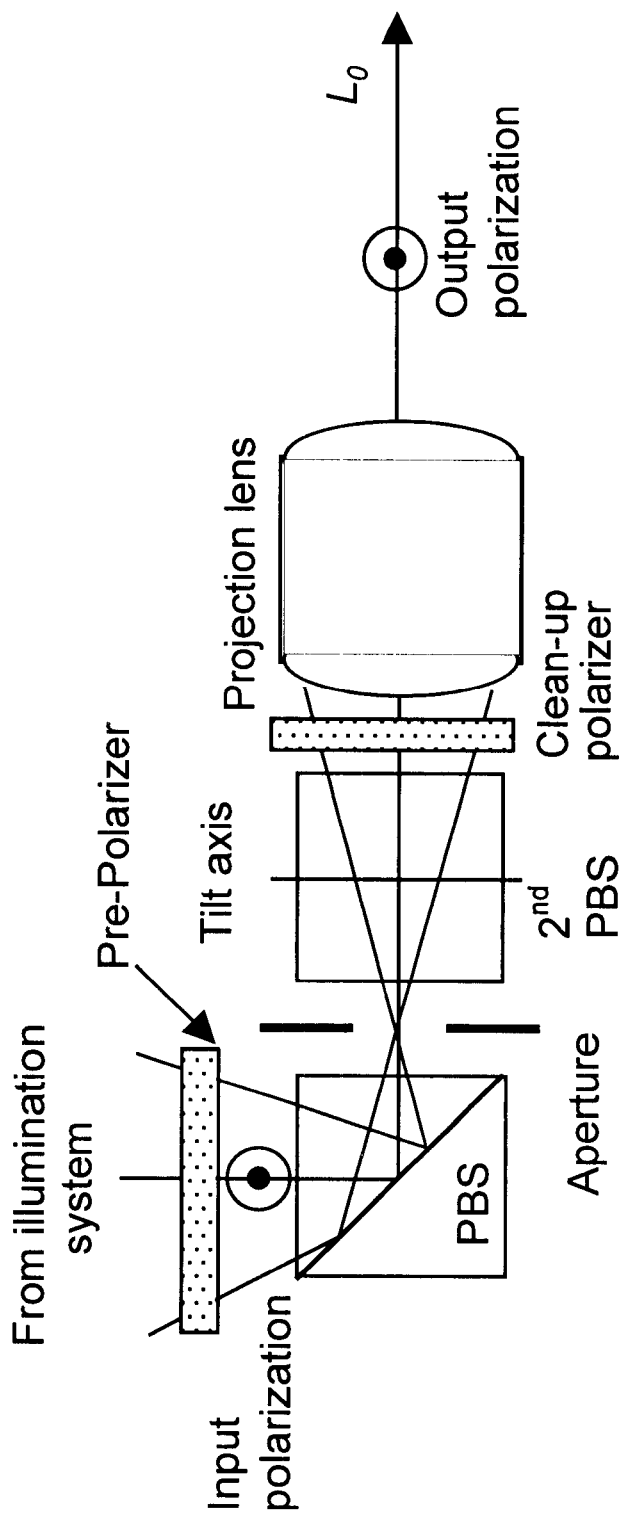
FIG. 2b is the unfolded test bed used to measure the normalization constant.

FIG. 1 illustrates an optical display or imaging system 10 including a light beam source 12, providing a beam of light 14. The term "beam of light" includes the visible spectrum, as well as the infrared and ultraviolet spectrum. The beam of light 14 may include ultraviolet photolit patterns or other types of radiation to be imaged using the reflective display. The light beam source 12 may be a coherent light beam source, a collimated light beam source, or other suitable light sources.

An illumination system includes the light beam source 12 and the illumination optics 16.

The beam of light 14 passes through illumination optics 16, which prepare the light. Light preparation may include beam shaping and homogenizing, definition of the f/# with appropriate lensing, pre-polarizing the light, and/or focusing the light onto the imager under test. The prepared light impinges upon a polarizing beam splitter ("PBS") element 20. The PBS element 20 transmits a first polarization component 22 of the incident light and reflects a second polarization component 24. One of the light components, in this case the reflected component 24, illuminates a reflective display or imager 26, such as a LCOS microdisplay. An aperture control device 28, such as an iris, located near the object plane of the projection optics 32 controls the aperture of the incident light component 22.

The reflective display 26, located close to the aperture control device 28, reflects the light component 24 and produces a reflected beam 30. The reflected beam 30 passes through the aperture control 28 and back onto the PBS 20. The PBS 20 partially transmits the polarization-modulated beam, which is projected by projection optics 32. The projection optics 32 include a projection lens 34 and a clean-up polarizer 36.

The throughput of the reflective display 26 depends on many aspects, including the inherent reflectivity; the LC mode utilized, such as twisted nematic, vertically aligned nematic, or ferroelectric; the surface quality of the mirror; defect formation (such as disclinations); and the pixel aperture ratio. Furthermore, some system parameters can interact with the microdisplay to vary the throughput. For example, the LC parameters vary with temperature. Therefore, the throughput may also vary with temperature and therefore indirectly on the lamp intensity. Photopic throughput may depend also on the lamp spectrum, so that the system modeler either needs to acquire spectral throughput to convolve with the lamp spectrum, or make measurements for the intended lamp. Another factor is diffraction effects from the interstitial areas between the pixels. A projection lens with f/# less than that of the illuminator will pick up more higher-order diffraction and thus put more light on the screen.

Therefore, for the best estimate of throughput in a particular system, the projection designer should measure the LCOS device 26 in a test bed closely resembling the complete system. Alternatively, one can design a test bed that controls these effects. A test bed with adjustable f/#s of both the illumination and projection legs, along with a temperature-controlled LCOS device, will provide a good approximation of the required information.

FIG. 2a illustrates the top view of an initial test bed 100 for the display system 10 illustrated in FIG. 1. The test bed 100 includes a light source 12 (not shown), illumination optics 16, PBS element 20, object aperture 28, display 26, and projection optics 32. The object aperture 28 may be circular or rectangular but it should be undersized in comparison to the active area of the microdisplay. The light source 100 should preferably be the same as the light source to be used in the final optical system, especially if non-spectral, photopic measurements are made.

The pre-polarizer is oriented so that vertically polarized light, i.e., light polarized out of the page, is incident upon the PBS. The PBS reflects the light beam toward the imager which, when it is addressed so as to be bright, substantially rotates the polarization into a horizontal state. This beam is reflected back to the PBS where it now passes through the PBS to the clean-up polarizer, to the projection lens, and onto the screen.

The method of the present invention measures the absolute throughput of a reflective display in a particular system. The method requires two measurements of the luminous output of the optical system. A first measurement of the light level, LR, is made using the test bed 100 illustrated in FIG. 2a in which the imager has been electrically addressed to its full on or "white" state. The measurement may be made by measuring the on-screen illuminance in lux using an illuminance meter such as the TI model from Minolta. A good method to measure the total luminous output of the projection system is to measure the ANSI lumens as outlined in ANSI/NAPM IT7.215-1992, "Data Projection Equipment and Large Screen Data Displays—Test Methods and Performance Characteristics." In this method, nine illuminance measurements are made at different points on the screen. The average value of the illuminance in lux is then multiplied by the illuminated area of the screen in square meters to yield the total light output in lumens. The extent of the illuminated area on the screen is defined by the object aperture and the magnification of the projection lens.

The second measurement, $L_O$, is made on the test bed shown in FIG. 2b. In this test bed, the microdisplay 26 is removed, the PBS 20 is rotated 90° to direct the light toward the projection optics 32, and the projection lens 34 is moved away to allow room for the object aperture 28 and a second equivalent PBS 40 to be inserted between the first PBS 20 and the projection lens 34. The projection lens 34 images the object aperture 28 onto the screen. The second PBS 40 is of the same type and has equivalent optical characteristics as the first PBS 20. The second PBS 40 is cross-rotated so that it passes substantially all of the vertically polarized light coming from the first PBS. As such, the reflecting plane is oriented so that it would reflect the unwanted polarization out of the plane of the page. The tilt axis of the beam-splitting surface of the PBS cube is defined to be a vector passing normally from a cube face that contains the diagonal of the beam-splitting surface. The tilt axis is the axis around which the beam-splitting surface tilts with respect to the cube faces. As such, the two PBSs have orthogonal tilt axes. The tilt axis of the first PBS points out of the page and the second points in the plane of the page. The two PBSs are said to be cross-rotated with respect to each other. The clean-up polarizer is now oriented to pass the vertically oriented light, rather than horizontally polarized light as in the first measurement.

In calculating the lumens, $L_O$, of the luminous output of the unfolded test bed of FIG. 2b, care must be taken to re-measure the illuminated area. This area may change if the projection lens was moved relative to the screen.

In a preferred embodiment the test bed 100 is the same or optically equivalent to the optical system 10.

The second measurement, $L_O$, is used to normalize the first measurement, $L_R$, to obtain a fractional transmission for the reflective display, $T_R$, where $T_R=L_R/L_O$. A designer can use $T_R$ to make a meaningful prediction of the system brightness. The effect of the second cross-rotated PBS is to analyze the light incident upon it as similarly as possible to the way the single PBS does in FIG. 2a. The presence of the second equivalent PBS accounts for the inevitable reflective and absorptive losses present in the second pass through the PBS of FIG. 2a.

Figure 3A:
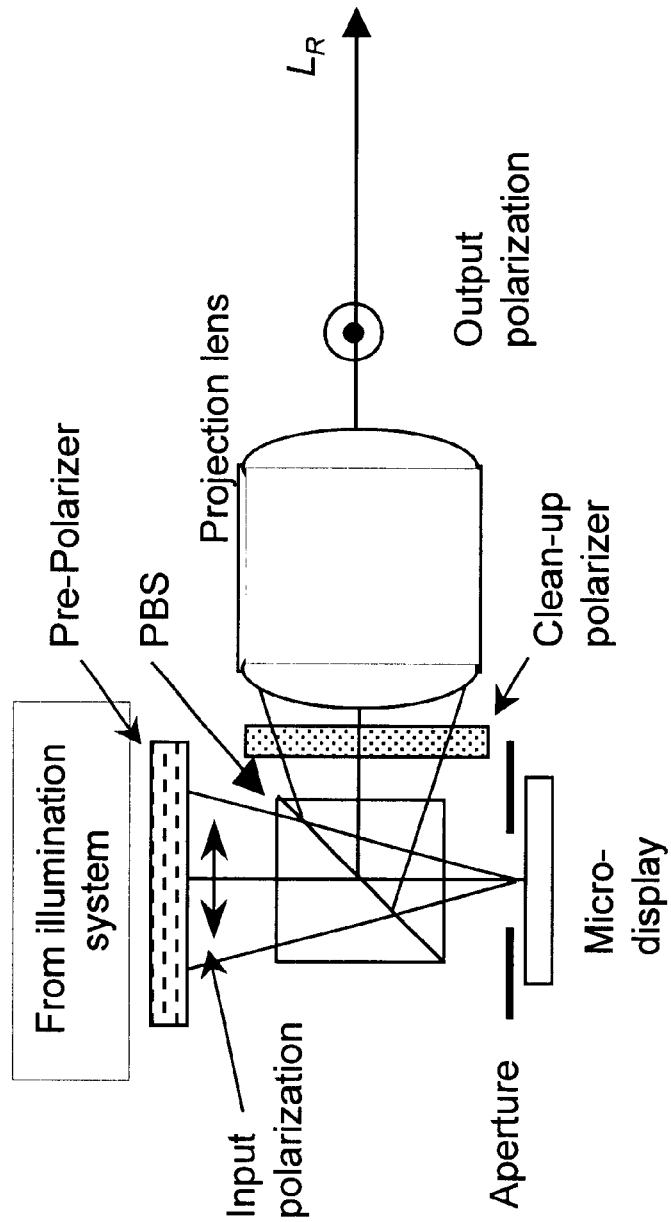
FIG. 3a is an alternate test bed with the microdisplay under test in place.

FIG. 3 shows a second embodiment of the method for a system in which the image is reflected. A first measurement $L_R$, is made using the test bed 100 illustrated in FIG. 3a in which the imager has been addressed to its full on or "white" state. The measurement may be made by measuring the on-screen illuminance in lux using an illuminance meter such as described earlier. The total luminous output of the projection system is measured. $L_R$ can then be calculated by calculating the ANSI lumens.

Figure 3B:
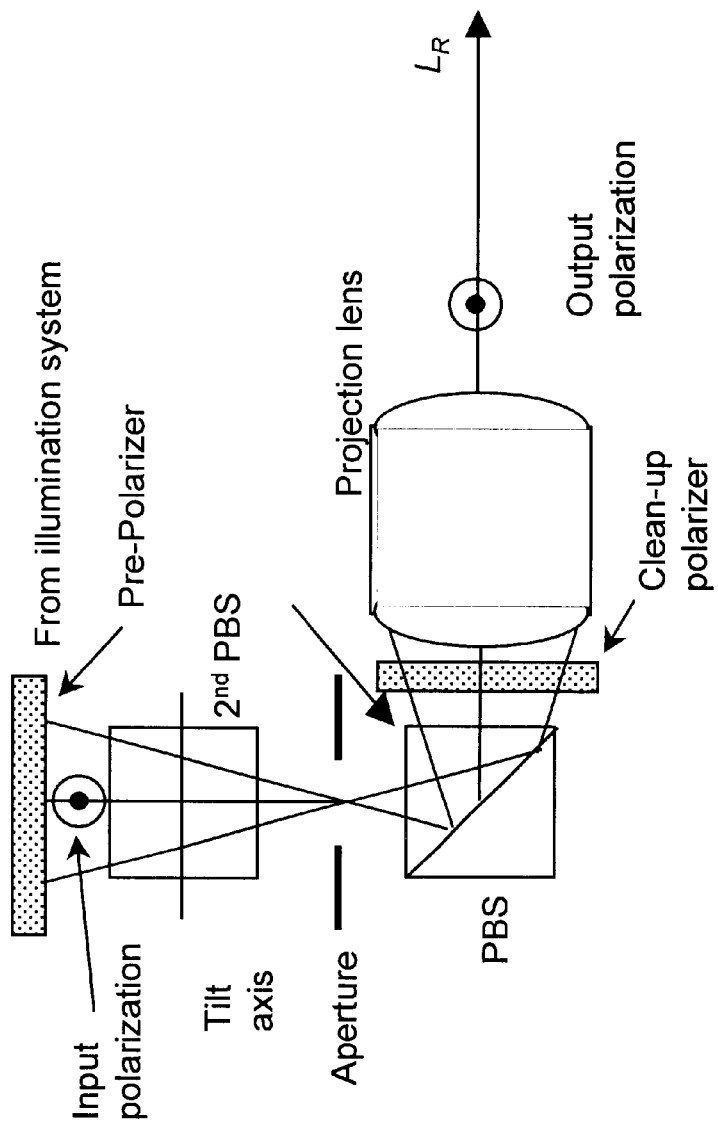
FIG. 3b is the unfolded alternate test bed used to measure the normalization constant.

The second measurement, $L_O$, is made on the unfolded test bed, as is shown in FIG. 3b. In this test bed, the microdisplay 26 is removed, the PBS 20 is rotated 90° to direct the light toward the projection optics 32, and the illumination system 12 is moved away from the first PBS to allow room for the object aperture 28 and a second equivalent PBS 40 to be inserted between the first PBS 20 and the illumination system 12. The illumination system must be rotated 90° about the optic axis so that the polarization presented to the PBS is vertical (out of the page as shown in FIG. 3b). The projection lens 34 images the object aperture 28 onto the screen. The object aperture 28 may be circular or rectangular but it should be undersized in comparison to the active area of the microdisplay.

The second PBS 40 is of the same type and has equivalent optical characteristics as the first PBS 20. The second PBS 40 is rotated so that it passes substantially all of the vertically polarized light coming from the illumination system. As such, the reflecting plane is oriented so that it would reflect the unwanted polarization out of the plane of the page. The two PBSs have orthogonal tilt axes and are cross-rotated. The tilt axis of the first PBS points out of the page and the second points in the plane of the page.

The tester has some options for data capture. As described above, a simple camera lens can project light to a wall where an illuminance meter, such as the Minolta $T_1$ meter, is used to measure the photopic light intensity in an appropriate unit such as lux. Coupled with a measurement of the illuminated area on screen one can calculate the number of lumens delivered by the optical system. If spectro-radiometric information is required, a spot spectro-colorimeter such as a PR-650 available from Photo Research, Inc., can be aimed at the screen center and values of $L_R$ and $L_O$ taken for discrete wavelengths. The PR-650 will return power values in units of $W/m^2/str/nm$ every 4 nm between 380 nm and 780 nm and thus the spectral throughput, $T_R(\lambda)=L_R(\lambda)/L_O(\lambda)$, is obtained where $\lambda$ is the wavelength of light.

The f/# of the system can be varied in two different locations. The f/# of the illumination light beam prepared by the illumination optics 12 can vary as well as the f-stop of the camera lens can vary the f/# in the projection optics. These may be varied independently so that diffraction effects may be studied as mentioned above.

The optical system considered does not have to operate solely in visible light. If the system operates in the UV, such as might be used in a photolithography exposure system, an UV power meter such as a solar-blind vacuum photodiode would be appropriate to measure the throughput of the reflective LC device. If the optical system operates in the infrared, such as a polarization mode dispersion compensator, an IR power meter such as a multi-junction thermopile would be an appropriate instrument to measure optical power.

Furthermore, the optical system does not have to have an illumination system that is uses an arc lamp and reflector defining a illumination cone angle and thus f/#. The illumination system may prepare a collimated light beam. Furthermore, the system may prepare a coherent and/or monochromatic light beam such as is delivered from a laser illumination system.

In one preferred embodiment, the projection lens used in the optical system is designed specifically for that optical system. A simple camera lens will in general not be sufficient for the optical system, as it may suffer from spherical aberration and possible vignetting of the optical beam. However, this will effect the throughput of the projection lens only, and is therefore not a problem for the test method described herein. The effect will be normalized out of the measurement, yielding a substantially accurate measure of the imager throughput.

Alternatively, the projection lens may be replaced by an integrating sphere that captures all of the light emanating from the optical system prior to the projection lens. In this case it may be desirable to place another pair of telecentric lenses between the optical system and the integrating sphere. This will allow the f/# of the projection or collection system to be varied independently from that of the illumination system. The tester may measure the throughput into the integrating sphere photopically or spectro-radiometrically and for different f/#s depending on the tester's needs.

The techniques described above allow for accurate absolute photopic and spectral throughput measurements for LCOS microdisplays used in folded light path systems employing a PBS. It is clearly possible to use a similar approach to unfolding light paths for systems based on off-axis illumination (e.g. the Nova$^{TM}$ Engine by S-VISION (M. Bone, M. Francis, P. Menard, M. Stefanov, and Y. Ji, "Novel Optical System Design for Reflective CMOS Technology," *Projection Displays V*, SPIE *3634, 80–86* (1999), included herein by reference). Using the present method, the tester may provide system designers absolute spectral throughput curves as a function of the f/# of both the illumination optics and separately of the projection optics.

A third embodiment encompasses measuring the absolute throughput of a reference sample, such as a nominally quarter-wave film laminated to a first surface mirror as described above in embodiments one and/or two, and using this reference sample as a reflectance standard. The throughput may be measured spectrally or photopically. The throughput of the standard is, by definition, $T_{Std}=L_S/L_O$, where $L_S$ is the measured light output of the optical system with the standard in place. The throughput of an imager under test may be found by again making two measurements. This time, however, the system remains unfolded as shown in FIGS. 2a or 3a. The two light level measurements are $L_M$, and LS, where the former measurement is the measured light output of the optical system with the imager in place. The absolute throughput is then calculated by dividing the two measurements, one by the other, and then multiplying by the previously measured $T_S$, that is, $T_M=(L_{Img}/L_S)=T_S$. Because the absolute throughput of the standard may vary from optical system to optical system it is preferred that $T_S$ be measured in the same optical system as $L_M$.

EXAMPLES

The throughput of two different QWFs laminated to mirrors, a Nitto Denko QWF and one from Edmund Scientific, were measured. In the data below, both types of measurements are reported using an integrating sphere to measure the light levels. A PR-650 photometer fitted with a cosine receptor is used to measure the spectral irradiance. The illumination system is a fiber-bundle illuminator in which the end of the fiber bundle is imaged one-to-one via a pair of telecentric lenses onto the microdisplay. The telecentric stop between the lenses controls the f/# of the illumination system.

Each QWF was mounted in a system similar to that shown in FIG. 2a. The projection lens was replaced by a second pair of telecentric lenses positioned in the projection leg to image the microdisplay at the entrance port of the sphere. The telecentric stop was chosen to match the f/# of the illumination leg. This stop may be changed to study the diffraction effects noted above. Both the illumination and projection stops were set to f/3.0.

Figure 4:
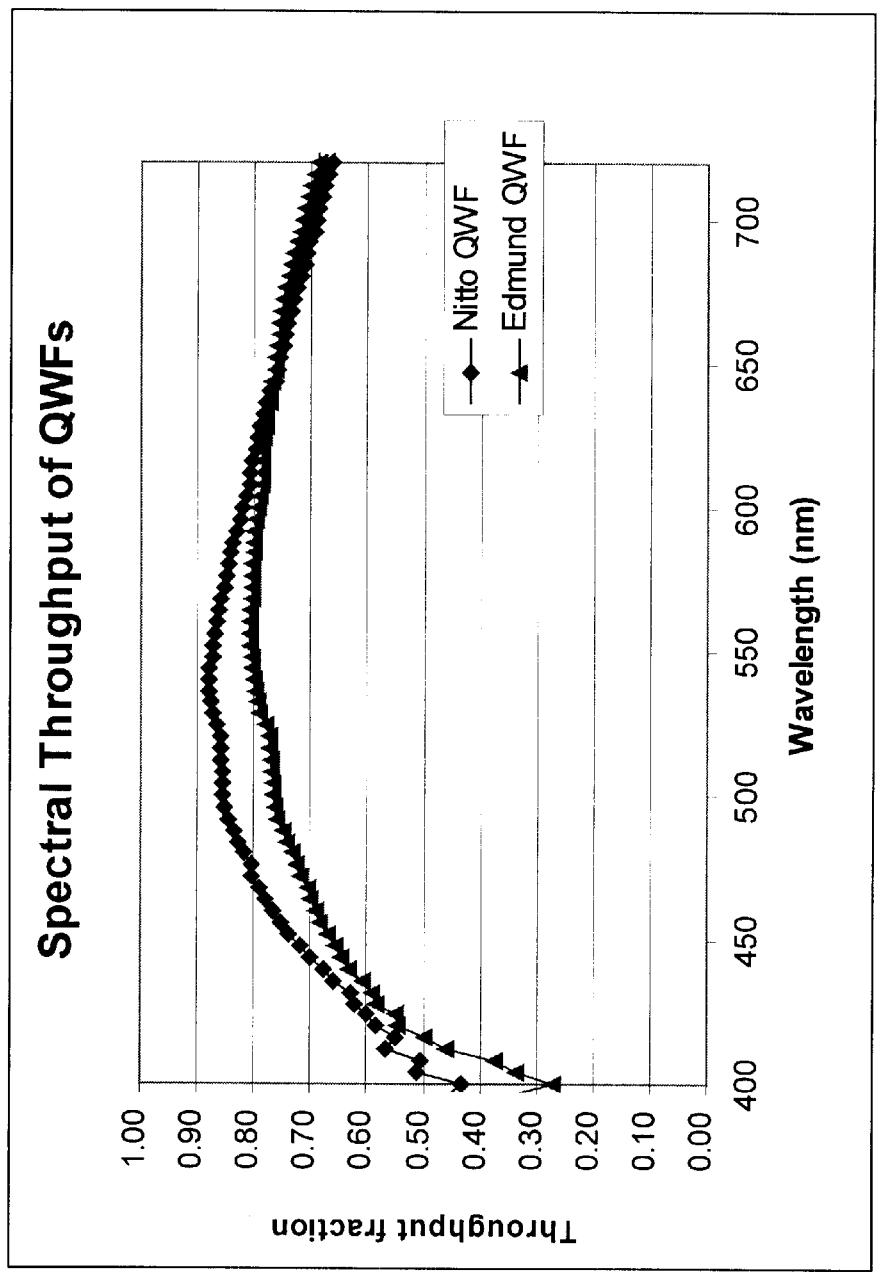
FIG. 4 is the spectral absolute throughput of two QWF/mirror laminates.

The results shown in FIG. 4 reveal that the Nitto Denko QWF is more efficient and the transmission peak is blue-shifted in comparison to the Edmund QWF. Photopically, $T_M=84.1\%$ for the Nitto Denko QWF and 79.2% for the Edmund QWF.

Either of these two QWF/mirrors may now be chosen to be a standard for LCOS microdisplays measured in the same optical system. Alternatively, the measurement may be repeated with the microdisplays in place of the QWF/mirror. The latter procedure was used to measure an SXGA-resolution microdisplay available from Three Five Systems.

Figure 5:
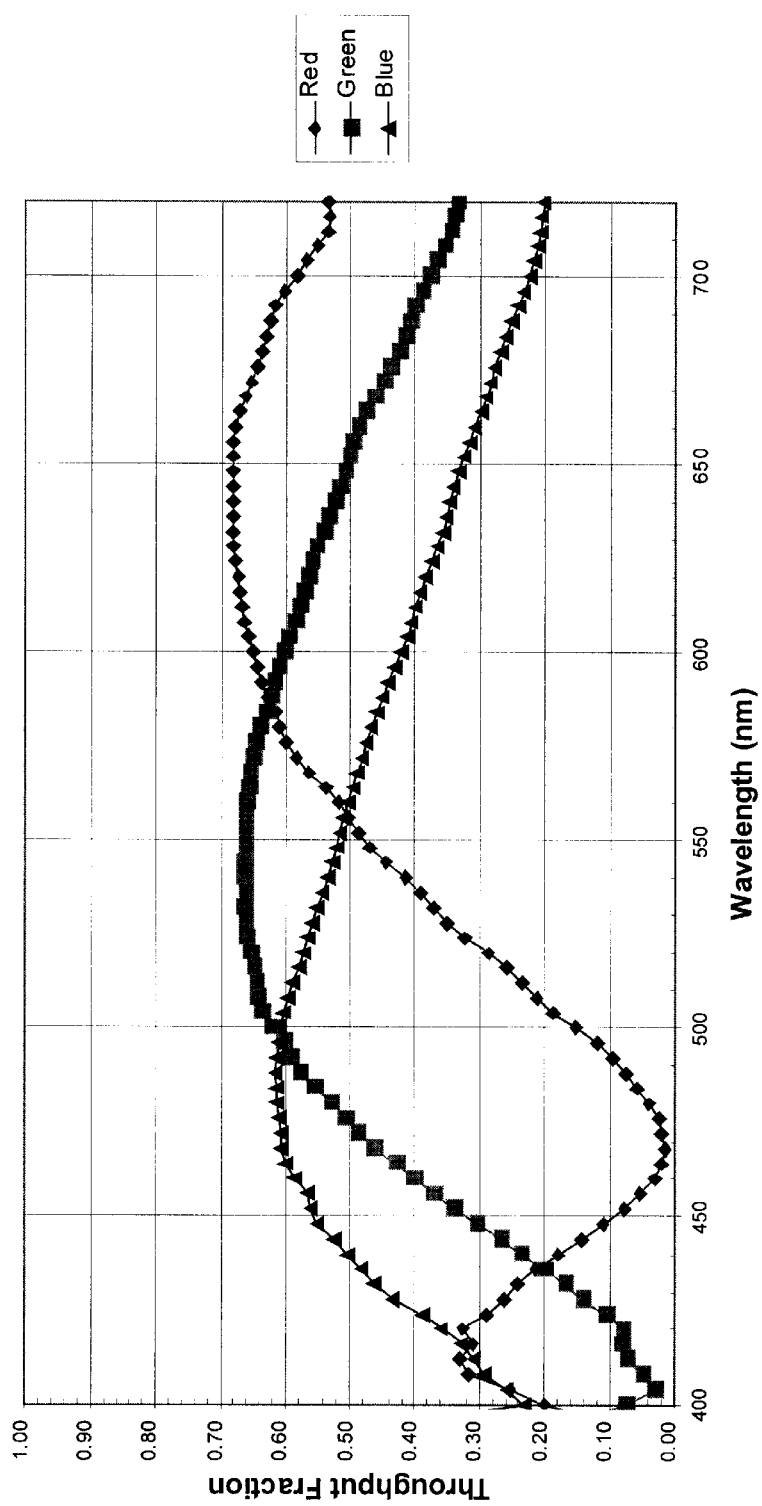
FIG. 5 is the spectral absolute throughput of an example LCOS microdisplay.

Using the procedure and set-up described for the QWF/mirror assemblies, the three LCOS microdisplays were measured to determine their throughput at f/3.21. The results are shown in FIG. 5. Each microdisplay was designed to work in a different color band, one in blue, one in green, and one in red. They were also designed to work at elevated temperatures. Therefore, the microdisplays were mounted to a thermo-electric heater and their temperature was set to 45° C. The driving voltage was set so that the highest in-band transmission was obtained without creating defects. It is apparent from FIG. 5 that the microdisplays have been tuned to deliver maximum transmission in the band for which they were designed.

Those skilled in the art will appreciate that the present invention may be used when coupling a variety of optical devices and even non-optical devices that require precise alignment. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A method for measuring the absolute light throughput of a polarization modulating reflective display in an optical system having a folded light path, the method comprising the steps of a) measuring a first light intensity, $L_R$, delivered in the folded light path, wherein a first polarization component of a light beam prepared by the optical system is folded by a first polarizing beam splitter and a second polarization component of the light beam is transmitted by the first polarizing beam splitter, wherein one of the polarization components is reflected off the reflective display;

b) measuring a second light intensity, $L_O$, delivered by the optical system in an unfolded light path in which the reflective display has been removed, the light path having the first polarizing beam splitter and a second cross rotated polarizing beam splitter having equivalent optical performance characteristics, wherein the light beam is transmitted by one of the PBS and reflected by the other; and c) calculating the absolute throughput, $T_M$, where $T_M=L_R/L_O$.

2. The method of claim 1, wherein the polarization component reflected off the reflective display is the first polarization component.

3. The method of claim 1, wherein the polarization component reflected off the reflective display is the second polarization component.

4. The method of claim 1, wherein the steps of measuring include measuring the first and second light intensity photopically.

5. The method of claim 1, wherein the steps of measuring include measuring the first and second light intensity radiometrically.

6. The method of claim 1, wherein the steps of measuring include measuring the first and second light intensity spectro radiometrically.

7. The method of claim 1, wherein the beam of light includes infrared radiation.

8. The method of claim 1, wherein the beam of light includes ultraviolet radiation.

9. The method of claim 1, wherein the steps of measuring the first and the second light intensity include using an illumination system having variable f/# of illumination, the method further including repeating the steps of measuring the first and the second light intensity for different f/#s of illumination and calculating the absolute throughput for the reflective display for the different f/#s of illumination.

10. The method of claim 1, wherein the steps of measuring the first and the second light intensity include using a projection system having variable f/#s, the method further including repeating the steps of measuring the first and the second light intensity for different projection f/#s and calculating the absolute throughput for the reflective display for the different projection f/#s.

11. The method of claim 1 wherein the steps of measuring the first and the second light intensity include using a coherent light beam source.

12. The method of claim 1 wherein the steps of measuring the first and the second light intensity include using a collimated light beam source.

13. The method of claim 1 wherein the polarization modulating reflective display is a quarter-wave film laminated to a mirror wherein the quarter-wave mirror laminated to the mirror becomes a reflection standard of known throughput, $T_S$, to be compared with other polarization modulating reflective displays.

14. The method of claim 13 wherein the throughput of a polarization modulating reflective display is measured by a) measuring a first light intensity, $L_R$, delivered in the folded light path, wherein a first polarization component of a light beam prepared by the optical system is folded by a first polarizing beam splitter and a second polarization component of the light beam is transmitted by the first polarizing beam splitter, wherein one of the polarization components is reflected off the reflective display;

b) measuring a second light intensity, $L_S$, delivered in the folded light path, wherein a first polarization component of a light beam prepared by the optical system is folded by a first polarizing beam splitter and a second polarization component of the light beam is transmitted by the first polarizing beam splitter, wherein one of the polarization components is reflected off the reflection standard; and c) calculating the absolute throughput, $T_M$, where $T_M = (L_R/L_S) \times T_S$.

* * * * *